(12) United States Patent
Tanaka et al.

(10) Patent No.: US 9,056,925 B2
(45) Date of Patent: Jun. 16, 2015

(54) PROCESS FOR PRODUCTION OF MODIFIED CONJUGATED DIENE POLYMERS, MODIFIED CONJUGATED DIENE POLYMERS PRODUCED BY THE PROCESS, RUBBER COMPOSITIONS, AND TIRES

(75) Inventors: Ken Tanaka, Tokyo (JP); Kouji Masaki, Tokyo (JP); Yoichi Ozawa, Tokyo (JP); Eiji Suzuki, Cuyahoga Falls, OH (US); Christine M. Rademacher, Akron, OH (US); Terrence E. Hogan, Akron, OH (US); Takuo Sone, Tokyo (JP); Takaomi Matsumoto, Tokyo (JP)

(73) Assignees: BRIDGESTONE CORPORATION, Tokyo (JP); JSR CORPORATION, Tokyo (JP)

( * ) Notice: Subject to any disclaimer, the term of this patent is extended or adjusted under 35 U.S.C. 154(b) by 1133 days.

(21) Appl. No.: 12/446,799

(22) PCT Filed: Oct. 25, 2007

(86) PCT No.: PCT/JP2007/070846
§ 371 (c)(1),
(2), (4) Date: Aug. 31, 2009

(87) PCT Pub. No.: WO2008/050845
PCT Pub. Date: May 2, 2008

(65) Prior Publication Data
US 2010/0016496 A1 Jan. 21, 2010

Related U.S. Application Data

(63) Continuation-in-part of application No. 11/585,810, filed on Oct. 25, 2006, now abandoned.

(51) Int. Cl.
| | |
|---|---|
| C08L 83/00 | (2006.01) |
| C08C 19/25 | (2006.01) |
| B60C 1/00 | (2006.01) |
| C08C 19/44 | (2006.01) |
| C08L 15/00 | (2006.01) |
| C08L 21/00 | (2006.01) |

(52) U.S. Cl.
CPC ............... *C08C 19/25* (2013.01); *B60C 1/0016* (2013.04); *B60C 1/0025* (2013.04); *C08C 19/44* (2013.01); *C08L 15/00* (2013.01); *C08L 21/00* (2013.01)

(58) Field of Classification Search
USPC ........ 525/331, 331.9; 524/424, 572, 506, 588
See application file for complete search history.

(56) References Cited

U.S. PATENT DOCUMENTS

| | | | |
|---|---|---|---|
| 2004/0254301 A1 | 12/2004 | Tsukimawashi et al. | |
| 2005/0159554 A1* | 7/2005 | Endou et al. | 525/242 |
| 2007/0149744 A1 | 6/2007 | Yan et al. | |

FOREIGN PATENT DOCUMENTS

| | | |
|---|---|---|
| EP | 1 245 585 A2 | 10/2002 |
| EP | 1 449 857 A1 | 8/2004 |
| EP | 1 462 459 A1 | 9/2004 |
| EP | 1 479 698 A1 | 11/2004 |
| EP | 1 505 087 A1 | 2/2005 |
| EP | 1 726 598 A1 | 11/2006 |
| JP | 6-53763 A | 2/1994 |
| JP | 6-57767 A | 3/1994 |
| JP | 2001-158837 A | 6/2001 |
| JP | 2003-514078 A | 4/2003 |
| JP | 2003-246817 A | 9/2003 |
| JP | 2004-168903 A | 6/2004 |
| JP | 2004-168904 A | 7/2004 |
| JP | 2005-8870 A | 1/2005 |
| JP | 2006-257112 A | 9/2006 |
| WO | 01/34658 A1 | 5/2001 |
| WO | 03/029299 A1 | 4/2003 |
| WO | 03/046020 A1 | 6/2003 |
| WO | 03/048216 A1 | 6/2003 |
| WO | 03/087171 A1 | 10/2003 |
| WO | 2005/087814 A1 | 9/2005 |
| WO | 2006/047328 A1 | 5/2006 |
| WO | 2006/101025 A1 | 9/2006 |
| WO | 2007/034785 A1 | 3/2007 |
| WO | 2007/040252 A1 | 4/2007 |

* cited by examiner

*Primary Examiner* — Wenwen Cai
(74) *Attorney, Agent, or Firm* — Sughrue Mion, PLLC

(57) ABSTRACT

A process for producing a modified conjugated diene based polymer includes a step (a) of reacting a silicon compound with a conjugated diene based polymer having an active end so that the reaction takes place at the active end, the silicon compound having a protected primary amino group in the molecule thereof and a silicon atom to which a hydrocarbyloxy group and a reactive group are bonded, to thereby modify the active end, and a step (b) of performing condensation reaction, in the presence of a titanium compound serving as a titanium-based condensation-accelerating agent. A rubber composition contains the modified diene polymer, and a tire is produced from the rubber composition.

21 Claims, No Drawings

US 9,056,925 B2

1

PROCESS FOR PRODUCTION OF MODIFIED CONJUGATED DIENE POLYMERS, MODIFIED CONJUGATED DIENE POLYMERS PRODUCED BY THE PROCESS, RUBBER COMPOSITIONS, AND TIRES

TECHNICAL FIELD

The present invention relates to a process for producing a modified conjugated diene based polymer, to a modified conjugated diene based polymer produced through the process, to a rubber composition, and to a tire. More particularly, the invention relates to a process for producing a modified conjugated diene based polymer which attains favorable interaction between a rubber component and carbon black and/or silica, thereby improving dispersibility of the fillers, which exhibits excellent properties such as heat-buildup-suppressing performance, fracture characteristics, and wear resistance, and which is remarkably consistent in quality; to a modified conjugated diene based polymer produced through the process; to a rubber composition containing the diene polymer; and to a tire produced from the rubber composition and exhibiting the above properties.

BACKGROUND ART

In recent years, social demand with respect to energy conservation and concerns about environmental problems have increased, and emission of carbon dioxide is now controlled more and more rigorously throughout the world. In the midst of such a trend, demand has increased for reducing fuel consumption of automobiles. In order to satisfy such demands, performance of tires must be enhanced; particularly, rolling resistance must be reduced. Previously, optimization of the structure of tires was investigated for reducing rolling resistance. However, at present, rolling resistance is generally reduced through employment of a low-heat-buildup rubber composition.

In order to produce such a low-heat-buildup rubber composition, a variety of modified rubbers containing silica or carbon black serving as a filler have been developed. Among the techniques for producing such modified rubbers, Japanese Patent Publication (kokoku) Nos. 6-53763 and 6-57767 and other documents disclose particularly effective approaches in which the polymerization active end of a conjugated diene based polymer produced through anionic polymerization in the presence of an organic lithium is modified with an alkoxysilane derivative having a functional group interacting with a filler.

Although, these approaches are generally effective for polymers having a stable polymerization living end, modification of a rubber composition containing silica or carbon black has not been satisfactorily attained. In addition, when a conventional modification technique is employed, in many cases, branching of the backbone of the polymer is insufficient. Therefore, when such a modified rubber is used in practice, problematic cold flow occurs. In this case, partial coupling is performed so as to prevent cold flow and, as a result, the effect of modification is reduced.

Thus, an approach for overcoming the above drawbacks and enhancing the effect of modification has been proposed. WO 03/087171 discloses a method in which a condensation-accelerating agent is added to a reaction system during modification of the active end of a conjugated diene based polymer with an alkoxysilane. Although the method successfully prevents loss of a silica filler in the rubber composition, loss of a carbon black filler cannot be satisfactorily prevented.

2

Patent document 1: Japanese Patent Application Examined Publication No. 53763/1994

Patent document 2: Japanese Patent Application Examined Publication No. 57767/1994

Patent document 3: WO03/087171 pamphlet

DISCLOSURE OF THE INVENTION

Problems to be Solved by the Invention

Under such circumstances, an object of the present invention is to provide a process for producing a modified conjugated diene based polymer which attains favorable interaction between a rubber component and carbon black and/or silica, thereby improving dispersibility of the fillers, and which exhibits excellent properties such as heat-buildup-suppressing performance, fracture characteristics, and wear resistance. Another object of the invention is to provide a modified conjugated diene based polymer produced through the process. Still another object of the invention is to provide a rubber composition containing the diene polymer. Yet another object is to provide a tire produced from the rubber composition and exhibiting the above properties.

Means for Solving the Problems

The present inventors have carried out extensive studies in order to attain the above objects, and have found that the objects can be attained by two-part process, including the step of modification reaction in which the active end of a conjugated diene based polymer is modified with a compound containing a bi-functional silicon atom, which compound has at least an amino group of a specific structure in the molecule thereof and a hydrocarbyloxy group bonded to the silicon atom; and the step of condensation reaction performed in the presence of a specific titanium compound serving as a condensation-accelerating agent. The present invention has been accomplished on the basis of this finding.

Accordingly, in a first aspect of the present invention, there is provided a process for producing a modified conjugated diene based polymer, the process comprising a step (a) of reacting a silicon compound with a conjugated diene based polymer having an active end so that the reaction takes places at the active end, the silicon compound having a protected primary amino group in the molecule thereof and a bi-functional silicon atom to which a hydrocarbyloxy group and a reactive group are bonded, to thereby modify the active end, and a step (b) of performing condensation reaction which involves the compound having a bi-functional silicon atom, in the presence of a titanium compound serving as a titanium-based condensation-accelerating agent.

The process may further include a deprotection step (c) of hydrolyzing a group which is bonded to the active end of the conjugated diene based polymer and which has been derived from the compound having a bi-functional silicon atom, whereby the protected primary amino group contained in the group bonded to the active end is converted to a free amino group.

The compound having a bi-functional silicon atom employed in the step (a) is a silicon compound represented by formula (I):

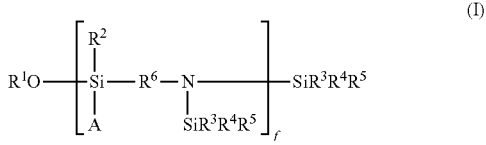

(I)

(wherein each of $R^1$ and $R^2$ represents a hydrocarbon group having 1 to 20 carbon atoms, each of $R^3$ to $R^5$ represents a hydrocarbon group having 1 to 20 carbon atoms, $R^6$ represents a divalent hydrocarbon group having 1 to 12 carbon atoms, A represents a reactive group, and f is an integer of 1 to 10);

a-silicon compound represented by formula (II):

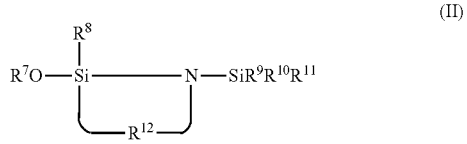

(II)

(wherein each of $R^7$ to $R^{11}$ represents a hydrocarbon group having 1 to 20 carbon atoms, and $R^{12}$ represents a divalent hydrocarbon group having 1 to 12 carbon atoms); or a silicon compound represented by formula (III);

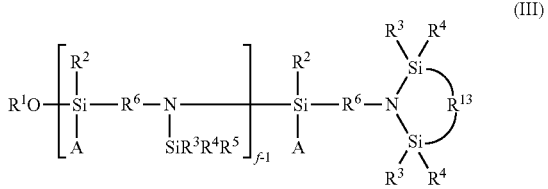

(III)

(wherein each of $R^1$ and $R^2$ represents a hydrocarbon group having 1 to 0.20 carbon atoms, each of $R^3$ to $R^5$ represents a hydrocarbon group having 1 to 20 carbon atoms, $R^6$ represents a divalent hydrocarbon group having 1 to 12 carbon atoms, $R^{13}$ represents a divalent hydrocarbon group having 1 to 12 carbon atoms, A represents a reactive group, and f is an integer of 1 to 10).

The group A in formula (I) is a halogen atom or a hydrocarbiloxy group having 1 to 20 carbon atoms.

The conjugated diene based polymer having an active end may be produced through anionic polymerization, in the presence of an organic alkali metal compound serving as a polymerization initiator, of a conjugated diene compound singly or of a conjugated diene compound and an aromatic vinyl compound in combination.

The conjugated diene compound is at least one species selected from the group of 1,3-butadiene, isoprene, and 2,3-dimethyl-1,3-butadiene.

The aromatic vinyl compound is styrene.

The conjugated diene based polymer has a polymer unit derived from an aromatic vinyl compound in an amount of 0 to 55 mass % based on the total polymer unit present in the conjugated diene based polymer and a vinyl bond content of 7 to 65 mass % based on the total conjugated diene portion.

The condensation-accelerating agent employed in the step (b) is at least one species selected from among a titanium alkoxide, a titanium carboxylate salt, a titanium acetylacetonate complex salt, and a salt mixture thereof.

In a second aspect of the present invention, there is provided a modified conjugated diene based polymer produced by the above process.

In a third aspect of the present invention, there is provided a rubber composition comprising the modified conjugated diene based polymer.

The rubber composition may comprise a rubber component containing 15 mass % or more of the modified conjugated diene based polymer in an amount of 100 parts by mass and silica and/or carbon black in the total amount of 20 to 120 parts by mass.

The rubber component may comprise the modified conjugated diene based polymer in an amount of 15 to 100 mass % and at least one species selected from among a natural rubber, a synthetic isoprene rubber, a butadiene rubber, a styrene-butadiene rubber, an ethylene-α-olefin copolymer rubber, an ethylene-α-olefin-diene copolymer rubber, a chloroprene rubber, a halogenated butyl rubber, and a styrene-isobutylene copolymer having a halomethyl group, in an amount of 85 to 0 mass %.

In a fourth aspect of the present invention, there is provided a pneumatic tire employing the rubber composition.

The pneumatic tire may employ the rubber composition as a tread, a base tread, or a sidewall thereof.

Effects of the Invention

According to the present invention, there can be provided a process for producing a modified conjugated diene based polymer which attains favorable interaction between a rubber component and carbon black and/or silica, thereby improving dispersibility of the fillers, which exhibits excellent properties such as heat-buildup-suppressing performance, fracture characteristics, and wear resistance, and which is remarkably consistent in quality; a modified conjugated diene based polymer produced through the process; a rubber composition containing the diene polymer; and a tire produced from the rubber composition and exhibiting the above properties.

BEST MODE FOR CARRYING OUT THE INVENTION

The process of the present invention for producing a modified conjugated diene dased polymer includes a step (a) of reacting a silicon compound with a conjugated diene based polymer having an active end so that the reaction takes places at the active end, the silicon compound having a protected primary amino group in the molecule thereof and a bi-functional silicon atom to which a hydrocarbyloxy group and a reactive group (hereinafter the compound may be referred to as "an alkoxysilane compound") are bonded, to thereby modify the active end, and a step (b) of performing condensation reaction which involves the compound having a bi-functional silicon atom, in the presence of a titanium compound serving as a titanium-based condensation-accelerating agent.

The condensation-accelerating agent is generally added after modification reaction in which the alkoxysilane compound is reacted with the active end of the conjugated diene based polymer, and before condensation reaction. Alternatively, the condensation-accelerating agent may be added before addition of the alkoxysilane compound (i.e., before modification reaction), followed by adding the alkoxysilane compound for modification and performing condensation reaction.

No particular limitation is imposed on the method for producing a conjugated diene based polymer having an active end employed in the present invention, and a conjugated diene based polymer may be produced from a diene monomer or a diene monomer and another comonomer. Examples of the mode of polymerization include solution polymerization, gas-phase polymerization, and bulk polymerization. Of these, solution polymerization is particularly preferred. The polymerization may be performed in a batch manner or a continuous manner.

The active site in the molecule of a conjugated diene based polymer is preferably at least one metal species selected from alkaline metals and alkaline earth metals. Of these, alkali metals are preferred, with lithium being particularly preferred.

In the solution polymerization, the polymer of interest may be produced through, for example, anionically polymerizing a conjugated diene compound alone or a conjugated diene compound with an aromatic vinyl compound in the presence of an organic alkali metal compound, particularly an organic lithium compound as a polymerization initiator. In the specification, the term "conjugated diene based polymer" refers not only to a polymer formed from a conjugated diene but also to a polymer formed from a conjugated diene and an aromatic vinyl compound.

In addition, in an effective manner, a halogen-containing monomer is employed, and a halogen atom contained in the formed polymer is activated by an organic metal compound. For example, a bromine site of a copolymer containing an isobutylene unit, a p-methylstylene unit, or a p-bromomethylstylene unit is lithiated to thereby provide an active site.

Examples of the aforementioned conjugated diene compound includes 1,3-butadiene, isoprene, 1,3-pentadiene, 2,3-dimethyl-1,3-butadiene, 2-phenyl-1,3-butadiene, and 1,3-hexadiene. These dienes may be used singly or in combination of two or more species. Among them, 1,3-butadiene, isoprene, and 2,3-dimethyl-1,3-butadiene are particularly preferred.

Examples of the aromatic vinyl compound used in copolymerization with these conjugated diene compounds includes styrene; α-methylstyrene, 1-vinylnaphthalene, 3-vinyltoluene, ethylvinylbenzene, divinylbenzene, 4-cyclohexylbenzene, and 2,4,6-trimethylstyrene. These compounds may be used singly or in combination of two or more species. Among them, styrene is particularly preferred.

In the case where the conjugated diene compound and the aromatic vinyl compound are used as comonomers, use of 1,3-butadiene and styrene are particularly preferred, from the viewpoint of practical aspects including availability, and anionic polymerization characteristics including a living property.

When solution polymerization is employed, the monomer concentration of the solution is preferably 5 to 50 mass %, more preferably 10 to 30 mass %. When the conjugated diene compound and the aromatic vinyl compound are used as comonomers, the monomer mixture preferably has an aromatic vinyl compound content falling within a range 0 to 55 mass %.

No particular limitation is imposed on the lithium compound serving as a polymerization initiator, and hydrocarbyllithium and a lithiumamide compound are preferably used. When hydrocarbyllithium is used, a conjugated diene based polymer which has a hydrocarbyl group at a polymerization-initiating end and a polymerization active site at the other end is produced, whereas when the lithiumamide compound is used, a conjugated diene based polymer which has a nitrogen-containing group at a polymerization-initiating end and a polymerization active site at the other end is produced.

The hydrocarbyllithium is preferably a compound having a C2 to C20 hydrocarbyl group. Specific examples include ethyllithium, n-propyllithium, isopropyllithium, n-butyllithium, sec-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, and a reaction product of diisopropenylbenzene with butyllithium. Among them, n-butyllithium is preferred.

Examples of the lithium amide compound includes, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, and lithium methylphenethylamide. Among them, cyclic lithium amides such as lithium hexamethyleneimide, lithium pyrrolidide, lithium piperidide, lithium heptamethyleneimide and lithium dodecamethyleneimide are preferred in terms of interaction with carbon black and polymerization initiating ability. Particularly preferred are lithium hexamethyleneimide and lithium pyrrolidide.

Generally, these lithium amide compounds for use in polymerization may be prepared in advance from a secondary amine and a lithium compound. Alternatively, the amide compounds may also be prepared in the polymerization system (in-situ). The polymerization initiator is preferably employed in an amount 0.2 to 20 mmol per 100 g of the monomer.

No particular limitation is imposed on the method for producing a conjugated diene based polymer through anionic polymerization employing the aforementioned lithium compound serving as a polymerization initiator, and any conventionally known methods may be employed.

In a specific procedure, a conjugated diene compound or a mixture of a conjugated diene compound and an aromatic vinyl compound is anionically polymerized in the presence of the lithium compound serving as a polymerization initiator and an optional randomizer in an organic solvent which is inert to the reaction, to thereby produce a conjugated diene based polymer of interest. Examples of the hydrocarbon solvent include aliphatic, alicyclic, and aromatic hydrocarbon compounds.

The hydrocarbon solvent is preferably a C3 to C8 hydrocarbon. Specific examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These hydrocarbons may be used singly or in combination of two or more species.

The randomizer, which may be used in accordance with needs, is a compound which is capable of controlling a microstructure of a conjugated diene based polymer (e.g., increasing 1,2-butadiene units in a butadiene-styrene copolymer or 3,4-bonds in an isoprene polymer) or controlling of the monomer unit composition distribution profile of a conjugated diene compound-aromatic vinyl compound copolymer (e.g., randomization in butadiene units and styrene units in a butadiene-styrene copolymer). No particular limitation is imposed on the type of randomizer, and any of compounds known as a randomizer may appropriately employed. Specific examples of the randomizer include ethers and tertiary amines such as dimethoxybenzene, tetrahydrofuran, dimethoxyethane, diethylene glycol dibutyl ether, diethylene glycol dimethyl ether, 2,2-bis(2-tetrahydrofuryl)propane, triethylamine, pyridine, N-methylmorpholine, N,N,N',N'-tetramethylethylenediamine and 1,2-piperidinoethane. Further, potassium salts such as potassium t-amylate and potassium t-butoxide and sodium salts such as sodium t-amylate may also be employed.

These randomizers may be used singly or in combination of two or more species. The randomizer is preferably employed in an amount 0.01 to 1000 mole equivalents per mole of the lithium compound.

The polymerization reaction is preferably carried out at 0 to 150° C., more preferably 20 to 130° C. The polymerization reaction may be carried out under generated pressure. In a general procedure, the pressure is preferably selected such that the monomer is maintained virtually as a liquid phase. That is, a higher pressure may be employed in accordance with needs, although depending on the individual substances to be polymerized, polymerization solvent, and polymerization temperature. Such pressure may be obtained through an appropriate method such as applying pressure to a reactor by use of gas inert to the polymerization reaction.

In the polymerization, all the raw materials involved in polymerization such as a polymerization initiator, a solvent, monomers, etc. are preferably employed after removing reaction-inhibiting substances such as water, oxygen, carbon dioxide, and protic compounds.

In order to produce an elastomeric polymer, the formed polymer or copolymer preferably has a glass transition temperature (Tg) of −95 to −15° C., as determined through differential thermal analysis. Through controlling of the glass transition temperature to fall within the above range, increase in viscosity is prevented, whereby a polymer which can be easily handled can be obtained.

In the present invention, the active end of the thus-produced conjugated diene based polymer is modified through reaction with a silicon compound having a protected primary amino group in the molecule thereof and a bi-functional silicon atom to which a hydrocarbyloxy group and a reactive group are bonded.

Examples of the silicon compound having a protected primary amino group in the molecule thereof and a bi-functional silicon atom to which a hydrocarbyloxy group and a reactive group are bonded (hereinafter the compound may be referred to as "a modifying agent") include the following compounds:

a silicon compound represented by formula (I):

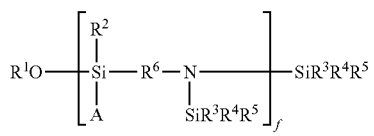

(wherein each of $R^1$ and $R^2$ represents a hydrocarbon group having 1 to 20 carbon atoms, each of $R^3$ to $R^5$ represents a hydrocarbon group having 1 to 20 carbon atoms, $R^6$ represents a divalent hydrocarbon group having 1 to 12 carbon atoms, A represents a reactive group, and f is an integer of 1 to 10);

a silicon compound represented by formula (II):

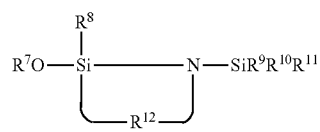

(wherein each of $R^7$ to $R^{11}$ represents a hydrocarbon group having 1 to 20 carbon atoms, and $R^{12}$ represents a divalent hydrocarbon group having 1 to 12 carbon atoms); and a silicon compound represented by formula (III):

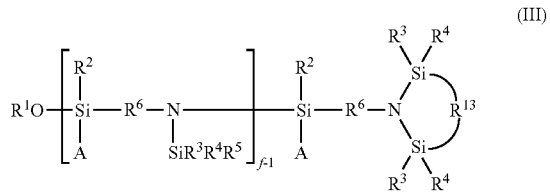

(wherein each of $R^1$ and $R^2$ represents a hydrocarbon group having 1 to 20 carbon atoms, each of $R^3$ to $R^5$ represents a hydrocarbon group having 1 to 20 carbon atoms, $R^6$ represents a divalent hydrocarbon group having 1 to 12 carbon atoms, $R^{13}$ represents a divalent hydrocarbon group having 1 to 12 carbon atoms, A represents a reactive group, and f is an integer of 1 to 10).

In the above formulas (I) to (III), specific examples of each monovalent hydrocarbon group having 1 to 20 carbon atoms include methyl, ethyl, n-propyl, isopropyl, n-butyl, isobutyl, sec-butyl, tert-butyl, pentyls, hexyls, octyls, decyls, dodecyls, tetradecyls, hexadecyls, octadecyls, icosyls, cyclopentyl, cyclohexyl, vinyl, propenyl, allyl, hexenyl, octenyl, cyclopentenyl, cyclohexenyl, phenyl, tolyl, xylyl, naphthyl, benzyl, phenethyl, and naphthylmethyl. Of these, those having 1 to 4 carbon atoms such as methyl, ethyl, n-propyl, isopropyl, n-butyl, isobutyl, sec-butyl, and tert-butyl are preferred, with ethyl, methyl, and tert-butyl being more preferred.

Examples of the divalent hydrocarbon group having 1 to 12 carbon atoms include alkylene groups having 1 to 12 carbon atoms, arylene groups having 6 to 12 carbon atoms, and arylene-alkylene groups having 7 to 12 carbon atoms.

These alkylene groups having 1 to 12 carbon atoms may be either linear or branched. Specific examples include linear alkylene groups such as methylene, ethylene, trimethylene, tetramethylene, hexamethylene, octamethylene, and decamethylene; and branched alkylenes such as propylene, isopropylene, isobutylene, 2-methyltrimethylene, isopentylene, isohexylene, isooctylene, 2-ethylhexylene, and isodecylene.

Examples of the arylene group having 6 to 12 carbon atoms include phenylene, methylphenylene, dimethylphenylene, and naphthylene. Examples of the arylene-alkylene group having 7 to 12 carbon atoms include phenylene-methylene, phenylene-ethylene, and xylylene. Among them, alkylene groups having 1 to 4 carbon atoms are preferred, with trimethylene being particularly preferred.

The reactive group A is preferably a halogen atom or a hydrocarbyloxy group having 1 to 20 carbon atoms. Examples of the halogen atom include fluorine, chlorine, bromine, and iodine. Of these, chlorine is preferred.

Examples of the hydrocarbyloxy group having 1 to 20 carbon atoms include alkoxy groups having 1 to 20 carbon atoms, aryloxy groups having 6 to 20 carbon atoms, and aralkyloxy groups having 7 to 20 carbon atoms.

Examples of the alkoxy group having 1 to 20 carbon atoms include methoxy, ethoxy, n-propoxy, n-butoxy, isobutoxy, sec-butoxy, tert-butoxy, hexoxy groups, octoxy groups, decyloxy groups, dodecyloxy groups, tetradecyloxy groups, hexadecyloxy groups, octadecyloxy groups, and icosyloxy groups. Examples of the aryloxy group having 6 to 20 carbon atoms include phenoxy, methylphenoxy, dimethylphenoxy, and naphthoxy. Examples of the aralkyloxy group having 7 to 20 carbon atoms include benzyloxy, phenethyloxy, and naphthylmethoxy. Of these, alkoxy groups having 1 to 4 carbon atoms are preferred, with ethoxy being particularly preferred.

Examples of other reactive groups include groups including a carbonyl group, an acid anhydride residue, a dihydroimidazolynyl group, an N-methylpyrrolidonyl group, an isocyanate group, etc.

In formula (I), two of $R^3$, $R^4$, and $R^5$ may be linked together with the silicon atom to form a 4- to 7-membered ring. Similarly, in formula (II), two of $R^9$, $R^{10}$, and $R^{11}$ may linked together with the silicon atom to form a 4- to 7-membered ring. Examples of the 4- to 7-membered ring include those containing a methylene groups having 4 to 7 carbon atoms.

Examples of the silicon compound having a protected primary amino group and a bi-functional silicon atom to which at least an alkoxy group is bonded include N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, N,N-bis(trimethylsilyl)aminoethylmethyldiethoxysilane, and 1-trimethylsilyl-2-ethoxy-2-methyl-1-aza-2-cyclopentane.

Examples of such compounds in which A is a halogen atom include N,N-bis(trimethylsilyl)aminopropylmethylmethoxychlorosilane, N,N-bis(trimethylsilyl)aminopropylmethylethoxychlorosilane, N,N-bis(trimethylsilyl)aminoethylmethylmethoxychlorosilane, and N,N-bis(trimethylsilyl)aminoethylmethylethoxychlorosilane.

Of these, N,N-bis(trimethylsilyl)aminopropylmethyldimethoxysilane, N,N-bis(trimethylsilyl)aminopropylmethyldiethoxysilane, and 1-trimethylsilyl-2-ethoxy-2-methyl-1-aza-2-cyclopentane are preferred.

These modifying agents may be used singly or in combination of two or more species, and may be a partial condensate.

As used herein, the term "partial condensate" means a condensation product in which a part (not entirety) of SiOR moieties are condensed to form Si—O—Si bonds.

The polymer subjected to the modification reaction preferably contain at least 10% of living polymer chains.

Reaction between a living polymerization end, for example, $P^-Li^+$ and a modifying agent represented by formula (I) (f=1) is represented by the following scheme:

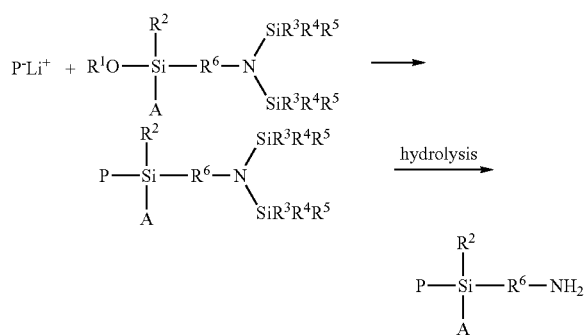

(wherein P represents a polymer chain of a conjugated diene compound chain or a copolymer chain of a conjugated diene compound and an aromatic vinyl compound.

Similarly, reaction between a living polymerization end, for example, $P^-Li^+$ and a modifying agent represented by formula (II) is represented by the following scheme.

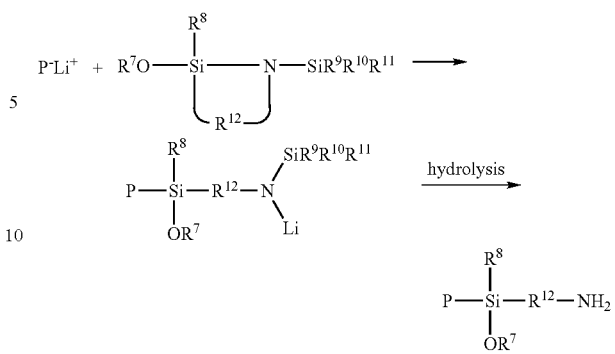

During modification reaction, the above modifying agent is preferably employed in an amount of 0.5 to 200 mmol/kg (conjugated diene based polymer), more preferably 1 to 100 mmol/kg (conjugated diene based polymer), particularly preferably 2 to 50 mmol/kg (conjugated diene based polymer). In the unit of the amount, the "conjugated diene based polymer" means the mass of polymer not containing additives such as an anti-aging agent added during or after the production of the diene polymer. Through controlling the amount of the modifying agent employed so as to fall within the above ranges, high dispersibility of fillers can be attained, and mechanical characteristics, wear resistance, and heat-buildup-suppressing performance after vulcanization can be enhanced.

No particular limitation is imposed on the method of adding the above modifying agent, and one batch addition, divided addition, continuous addition, etc. may be employed. Among them, one batch addition is preferred.

The modifying agent may act on any of a polymerization-initiating end, a polymerization-terminating end, a polymer backbone, and a polymer side chain. From the viewpoint of improvement of the heat-buildup-suppressing performance by preventing energy loss from a polymer end, the modifying agent is preferably introduced into the polymerization-initiating end or the polymerization-terminating end.

In the present invention, a specific condensation-accelerating agent is employed in order to accelerate condensation reaction involving the aforementioned alkoxysilane compound serving as a modifying agent.

The condensation-accelerating agent employed in the invention may be added to the reaction system before the aforementioned modification reaction. However, preferably, the agent is added to the reaction system after modification reaction and before condensation reaction. When the agent is added before modification reaction, in some cases, the agent is directly reacted with the active end, thereby failing to introduce a hydrocarbyloxy group to the active end.

When the agent is added after initiation of condensation reaction, in some cases, the condensation-accelerating agent is not uniformly dispersed in the reaction system, thereby deteriorating the catalyst performance.

The timing of addition of the condensation-accelerating agent is generally 5 minutes to 5 hours after initiation of modification reaction, preferably 15 minutes to one hour after initiation of modification reaction.

The condensation-accelerating agent employed in the step (b) of the present invention is preferably a titanium (Ti) alkoxide, a Ti carboxylate salt, or a Ti acetylacetonate complex.

Specific examples of the condensation-accelerating agent include tetrakis(2-ethyl-1,3-hexanediolato)titanium, tetrakis(2-methyl-1,3-hexanediolato)titanium, tetrakis(2-propyl-1, 3-hexanediolato)titanium, tetrakis(2-butyl-1,3-hexanediolato)titanium, tetrakis(1,3-hexanediolato)titanium, tetrakis(1,3-pentanediolato)titanium, tetrakis(2-methyl-1,3-pentanediolato)titanium, tetrakis(2-ethyl-1,3-pentanediolato)titanium, tetrakis(2-propyl-1,3-pentanediolato) titanium, tetrakis(2-butyl-1,3-pentanediolato)titanium, tetrakis(1,3-heptanediolato)titanium, tetrakis(2-methyl-1,3-heptanediolato)titanium, tetrakis(2-ethyl-1,3-heptanediolato)titanium, tetrakis(2-propyl-1,3-heptanediolato) titanium, tetrakis(2-butyl-1,3-heptanediolato)titanium, tetrakis(2-ethylhexoxy)titanium, tetramethoxytitanium, tetraethoxytitanium, tetra-n-propoxytitanium, tetraisopropoxytitanium, tetra-n-butoxytitanium, tetra-n-butoxytitanium oligomer, tetraisobutoxytitanium, tetra-sec-butoxytitanium, tetra-tert-butoxytitanium, bis(oleato)bis(2-ethylhexanoato)titanium, titanium dipropoxybis(triethanolamminate), titanium dibutoxybis(triethanolamminate), titanium tributoxystearate, titanium tripropoxystearate, titanium tripropoxyacetylacetonate, titanium dipropoxybis(acetylacetonate), titanium tripropoxy(ethylacetoacetate), titanium propoxyacetylacetonatebis(ethylacetoacetate), titanium tributoxyacetylacetonate, titanium dibutoxybis(acetylacetonate), titanium tributoxyethylacetoacetate, titanium butoxyacetylacetonatebis(ethylacetoacetate), titanium tetrakis(acetylacetonate), titanium diacetylacetonatebis(ethylacetoacetate), bis(2-ethylhexanoato)titanium oxide, bis(laurato)titanium oxide, bis(naphthato)titanium oxide, bis(stearato)titanium oxide, bis(oleato) titanium oxide, bis(linolato)titanium oxide, tetrakis(2-ethylhexanoato)titanium, tetrakis(laurato)titanium, tetrakis(naphthato)titanium, tetrakis(stearato)titanium, tetrakis(oleato)titanium, tetrakis(linolato)titanium, titanium di-n-butoxide bis(2,4-pentanedionate), titanium oxide bis(stearate), titanium oxide bis(tetramethylheptanedionate), titanium oxide bis(pentanedionate), and titanium tetra(lactate). Of these, tetrakis(2-ethyl-1,3-hexanediolato)titanium, tetrakis(2-ethylhexoxy)titanium, and titanium di-n-butoxide bis(2,4-pentanedionate) are preferred.

The condensation-accelerating agent is preferably employed at a mole ratio of the agent to the total amount of hydrocarbyloxy groups present in the reaction system of 0.1 to 10, particularly preferably 0.5 to 5. Through controlling the amount of the condensation-accelerating agent so as to fall within the above range, condensation reaction is effectively proceeds.

In the present invention, condensation reaction is preferably carried out in an aqueous solution. The condensation reaction temperature is preferably 85 to 180° C., more preferably 100 to 170° C., particularly preferably 110 to 150° C.

Through controlling the temperature during condensation reaction to fall within the above range, condensation reaction can be effectively completed, whereby aging reaction as elapse of time or other deterioration in quality of the produced modified conjugated diene based polymer can be prevented.

The condensation reaction is generally about 5 minutes to 10 hours, preferably about 15 minutes to 5 hours. Through controlling the condensation reaction time to fall within the above range, condensation reaction can be smoothly completed.

The pressure of the reaction system during condensation reaction is generally 0.01 to 20 MPa, preferably 0.05 to 10 MPa.

No particular limitation is imposed on the mode of condensation reaction, and a batch-type reactor may be employed. Alternatively, the reaction may be carried out in a continuous manner by means of an apparatus such as a multi-step continuous reactor. In the course of condensation reaction, removal of solvent may be simultaneously performed.

The amino group derived from a modifying agent for producing the modified conjugated diene based polymer of the present invention may be protected, or deprotected to be a primary amine. Both cases are preferred. In the case where a protected group is deprotected, the following procedure is performed.

Specifically, silyl protective groups on the protected amino group are hydrolyzed, to thereby form the corresponding free amino group. Through removal of the solvent from the thus-deprotected polymer, the corresponding dried polymer having a primary amino group is obtained. Needless to say, in any step from a step including the condensation to a step of removing solvent to produce a dried polymer, deprotection of the protected primary amino group derived from the modifying agent may be performed in accordance with needs.

In the present invention, after completion of the condensation, a deprotection step (c) may be performed. In the step (c), a group which is bonded to the active end of the conjugated diene based polymer and which has been derived from a compound having a bi-functional silicon atom is hydrolyzed, whereby the protected primary amino group in the end group is converted to a free amino group. Thus, a modified conjugated diene based polymer of interest can be produced.

The modified conjugated diene based polymer produced in the present invention preferably has a Mooney viscosity ($ML_{1+4}$, 100° C.) of 10 to 150, more preferably 15 to 100. Though controlling the Money viscosity to fall within the above range, a rubber composition exhibiting excellent kneadability and mechanical strength after vulcanization can be produced.

The rubber composition of the present invention preferably contains, as a rubber component, the aforementioned modified conjugated diene based polymer in an amount at least 20 mass %. The rubber component more preferably contains the modified conjugated diene based polymer in an amount of 30 mass % or more, particularly preferably 40 mass % or more. Through controlling the modified conjugated diene based polymer content of the rubber component to be 15 mass % or more, the rubber composition is endowed with a physical property of interest.

The modified conjugated diene based polymer species may be used singly or in combination of two or more species. Examples of the additional rubber component employed in combination with the modified conjugated diene based polymer include natural rubber, synthetic isoprene rubber, butadiene rubber, styrene-butadiene rubber, ethylene-α-olefin copolymer rubbers, ethylene-α-olefin-diene copolymer rubbers, acrylonitrile-butadiene copolymer rubber, chloroprene rubber, halogenated butyl rubbers, and mixtures thereof. These rubber species may be treated with a multi-functional modifying agent such as tin tetrachloride or silicon tetrachloride, to thereby have a branch structure.

The rubber composition of the present invention preferably contains, as a filler, silica and/or carbon black.

No particular limitation is imposed on the type of silica, and any of the silica species conventionally employed as rubber reinforcing fillers may be used.

Examples of the silica species include wet silica (hydrous silicic acid), dry silica (anhydrous silicic acid), calcium silicate, and aluminum silicate. Among them, wet silica is preferred, since the silica can remarkably improve both fracture characteristics and wet grip performance.

No particular limitation is imposed on the type of carbon black, and SRF, GPF, FEF, HAF, ISAF, SAF, etc. may be employed. The carbon black employed in the invention preferably has an iodine absorption (IA) of 60 mg/g or more and a dibutyl phthalate oil absorption (DBP) of 80 mL/100 g or more. By use of carbon black, grip performance and fracture characteristics can be greatly improved. From the viewpoint of wear resistance, HAF, ISAF, and SAF are particularly preferred.

The silica and/or carbon black may be used singly or in combination of two or more species.

The rubber composition preferably contains silica and/or carbon black in an amount of 20 to 120 parts by mass with respect to 100 parts by mass of the rubber component. From the viewpoint of reinforcing effects and improvement of physical properties, the amount is more preferably 25 to 100 parts by mass. Through controlling the amount of carbon black and/or silica to fall within the above range, a rubber composition exhibiting excellent operability in factories such as kneadability and fracture characteristics of interest can be produced.

The rubber composition of the present invention, when silica is employed as a reinforcing filler, a silane coupling agent may be incorporated into the composition in order to further enhance reinforcing performance and heat-buildup-suppressing performance.

Examples of the silane coupling agent includes bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamonyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazolyl tetrasulfide. Among them, bis(3-triethoxysilylpropyl) polysulfide and 3-trimethoxysilylpropylbenzothiazyl tetrasulfide are preferred from the viewpoint of an effect for improving the reinforcing property.

These silane coupling agents may be used singly or in combination of two or more species.

The rubber composition of the present invention employs, as a rubber component, a modified polymer in which a functional group having a high affinity to silica is introduced into an active site of the molecule thereof. Therefore, the amount of the silane coupling agent can be reduced as compared to the general cases. The amount of the silane coupling agent, which varies depending on the type of the agent, is preferably 1 to 20 mass % based on the silica. When the amount is less than 1 mass %, the effect of the coupling agent cannot sufficiently be attained, whereas when the amount is in excess of 20 mass %, the rubber component may be gelated. From the viewpoint of fully attaining the effect of coupling agent and prevention of gelation, the amount of the silane coupling agent is preferably 5 to 15 mass %.

So long as the object of the present invention is not impeded, the rubber composition of the present invention may further contain, in accordance with needs, a variety of chemicals usually used in the rubber industry. Examples of the chemicals include vulcanizing agents, vulcanization-accelerating agents, process oils, anti-aging agents, antioxidants, scorch preventives, zinc oxide, and stearic acid.

The rubber composition of the present invention is produced through kneading by means of an open kneader such as a roller or a closed kneader such as a Banbury mixer. The kneaded rubber composition is molded and, subsequently, vulcanized, to thereby provide a wide range of rubber product. Examples of such rubber products include tire-related uses such as tire treads, under treads, carcass sidewalls, and bead portion; vibration-insulating rubber; tenders; belts; hoses; and other industrial products. Particularly, the rubber composition of the invention, exhibiting well-balanced heat-buildup-suppressing performance, wear resistance, and fracture strength, is suitably employed as fuel-saving tires, large-scale tires, and treads for high-performance tires.

EXAMPLES

Next, the present invention will be described more specifically with reference to examples in the following. However the present invention is not limited to the examples.

In the Examples, physical properties of the samples were determined by the following procedures.

(1) Vinyl Content of Conjugated Diolefin Portion (% Based on the Entirety of the Diolefin Portion)

Vinyl content was determined by 270 MHz $^1$H-NMR.

(2) Bound Styrene Content (Mass % in Polymer)

Bound styrene content was determined by 270 MHz $^1$H-NMR.

(3) Weight Average Molecular Weight

Weight average molecular weight was determined, by gel permeation chromatography (GPC) (by means of a chromatograph, HLC-8220GPC, product of Tosoh Corporation). The result was expresses as the value of corresponding polystyrene as the reference.

(4) Mooney Viscosity ($ML_{1+4}$, 100° C.)

Mooney viscosity was determined in accordance with JIS K6300 (use of an L rotor, preheating for one minute, rotor operation for four minutes, and temperature of 100° C.).

(5) Evaluation of Physical Properties of Vulcanized Rubber

Physical properties of vulcanized rubber samples were determined by the following methods (i) and (ii).

(i) tan δ (50° C.): By means of a dynamic spectrometer (product of Rheometrix Co., Ltd.), tan δ (50° C.) was determined under a tensile strain of 1%, a frequency of 10 Hz, and 50° C., and represented by an index. The higher the index, the smaller the rolling resistance (the better the quality).

(ii) Wear resistance (Lanborn wear index): By means of a Lanborn type abrasion tester, the wear resistance at a percent slip of 25% was measured and represented by an index. The measurement was performed at room temperature. The higher the index, the better the wear resistance.

<Synthesis of Modifying Agent>

Synthesis Example 1

Synthesis of N,N-bis(trimethylsilyl)aminopropylmethyldiethoxysilane

Under nitrogen, 3-aminopropylmethyldiethoxysilane (product of Gelest) (36 g) for forming an aminosilane moiety was added to dichloromethane (solvent) (400 mL) placed in a glass flask equipped with an agitator. Subsequently, trimethylsilane chloride (product of Aldrich) (48 mL) and triethylamine (53 mL) for forming a protective moiety were added to the solution, followed by stirring the mixture at room temperature for 17 hours. The reaction mixture was evaporated by means of an evaporator, to thereby remove solvent from the mixture. The thus-obtained reaction mixture was distilled under reduced pressure (665 Pa), to thereby yield 40 g of N,N-bis(trimethylsilyl)aminopropylmethyldiethoxysilane as a 130-135° C. fraction.

Synthesis Example 2

Synthesis of 1-trimethylsilyl-2-ethoxy-2-methyl-1-aza-2-sila-cyclopentane

The procedure of Synthesis Example 1 was repeated, except that 2-ethoxymethyl-1-aza-2-cyclopentane (28 g) for forming an aminosilane moiety and trimethylsilane chloride (24 ml) for forming a protective moiety were employed, to thereby yield 1-trimethylsilyl-2-ethoxy-2-methyl-1-aza-2-sila-cyclopentane.

Synthesis Example 3

Synthesis of 3-(2,2,5,5-tetramethyl(1-aza-2,5-disila-cyclopentane)-1-yl)-propylmethyldiethoxysilane The procedure of Synthesis Example 1 was repeated, except that 1,2-bis(chloro-dimethylsilyl)-ethane (product of Gelest) (44 mL) for forming a protective moiety was employed, to thereby yield 3-(2,2,5,5-tetramethyl(1-aza-2,5-disilacyclopentane)-1-yl)-propylmethyldiethoxysilane.

Synthesis Example 4

Synthesis of N,N-bis(trimethylsilyl)aminopropyldimethylethoxysilane

The procedure of Synthesis Example 1 was repeated, except that 3-aminopropyldimethylethoxysilane (product of Gelest) (30 g) for forming an amino moiety was employed, to thereby yield N,N-bis(trimethylsilyl)aminopropyldimethylethoxysilane.

Synthesis Example 5

Synthesis of N-methyl-N-(trimethylsilyl)aminopropylmethyldiethoxysilane

The procedure of Synthesis Example 1 was repeated, except that N-methyl-3-aminopropylmethyldiethoxysilane (33 g), which had been synthesized through a procedure disclosed in Organic letters (2002), 4(13), 2117 to 2119, for forming an aminosilane moiety and trimethylsilane chloride (24 mL) for forming a protective moiety were employed, to thereby yield N-methyl-N-(trimethylsilyl)aminopropylmethyldiethoxysilane.

Synthesis Example 6

Synthesis of N,N-dimethyl-3-aminopropylmethyldiethoxysilane

The compound was synthesized in accordance with a procedure disclosed in Japanese Patent Application Laid-Open (kokai) No. 2003-155381.

Synthesis Example 7

Synthesis of N,N-bis(trimethylsilyl)aminopropyltriethoxysilane

Under nitrogen, 3-aminopropyltriethoxysilane (product of Gelest) (41 g) for forming an aminosilane moiety was added to dichloromethane (solvent) (400 mL) placed in a glass flask equipped with an agitator. Subsequently, trimethylsilane chloride (product of Aldrich) (48 mL) and triethylamine (53 mL) for forming a protective moiety were to the solution, followed by stirring the mixture at room temperature for 17 hours. The reaction mixture was evaporated by means of an evaporator, to thereby remove solvent from the mixture. The thus-obtained crude reaction mixture was distilled under reduced pressure (5 mm/Hg), to thereby yield 40 g of N,N-bis(trimethylsilyl)aminopropyltriethoxysilane as a 125-130° C. fraction.

Synthesis Example 8

Synthesis of N,N-bis(trimethylsilyl)aminopropylmethyldimethoxysilane

The procedure of Synthesis Example 1 was repeated, except that 3-aminopropylmethyldimethoxysilane (31.5 g) for forming an aminosilane moiety was employed, to thereby yield N,N-bis(trimethylsilyl)aminopropylmethyldimethoxysilane.

Synthesis Example 9

Synthesis of N,N-bis(trimethylsilyl)aminopropylethyldiethoxysilane

The procedure of Synthesis Example 1 was repeated, except that 3-aminopropylethyldiethoxysilane (38.6 g) for forming an aminosilane moiety was employed, to thereby yield N,N-bis(tritmethylsilyl)aminopropylethyldiethoxysilane.

Synthesis Example 10

Synthesis of N,N-bis(trimethylsilyl)aminobutylmethyldiethoxysilane

The procedure of Synthesis Example 1 was repeated, except that 4-aminobutylmethyldiethoxysilane (38.6 g) for forming an aminosilane moiety was employed, to thereby yield N,N-bis(trimethylsilyl)aminobutylmethyldiethoxysilane.

Synthesis Example 11

Synthesis of N,N-bis(trimethylsilyl)-p-aminophenylmethyldimethoxysilane

The procedure of Synthesis Example 1 was repeated, except that p-aminophenylmethyldimethoxysilane (38.6 g) for forming an aminosilane moiety was employed, to thereby yield N,N-bis(trimethylsilyl)-p-aminophenylmethyldimethoxysilane.

Synthesis Example 12

Synthesis of N,N-bis(trimethylsilyl)aminoundecylmethyldiethoxysilane

The procedure of Synthesis Example 1 was repeated, except that 11-aminoundecylmethyldiethoxysilane (37.1 g)

for forming an aminosilane moiety was employed, to thereby yield N,N-bis(trimethylsilyl)aminoundecylmethyldiethoxysilane.

Example 1

Synthesis of Copolymer A

To an autoclave reactor (inner volume: 5 L) whose atmosphere had been purged with nitrogen, cyclohexane (2,750 g), tetrahydrofuran (41.3 g), styrene (125 g), and 1,3-butadiene (375 g) were placed. The content of the reactor was adjusted to 10° C., and n-butyllithium (215 mg) was added thereto, to thereby initiate polymerization. The polymerization was carried out under adiabatic conditions. The temperature of the polymerization reached 85° C. (maximum).

When percent conversion in polymerization reached 99%, butadiene (10 g) was added to the polymerization system, followed by polymerization for a further 5 minutes. The resultant polymer solution was removed from the reactor, and a small aliquot of the solution was sampled and added to a methanol (1 g) in cyclohexane (30 g). N,N-bis(trimethylsilyl)aminopropylmethyldiethoxysilane (1,129 mg), obtained in Synthesis Example 1, was added thereto, and modification reaction was performed for 15 minutes. Subsequently, tetrakis(2-ethyl-1,3-hexanediolato)titanium (8.11 g) was added to the reaction mixture, followed by stirring for 15 minutes. Finally, after completion of reaction, 2,6-di-tert-butyl-p-cresol was added thereto. The mixture was subjected to steam stripping, to thereby remove solvent. The thus-formed rubber was dried by means of a hot roller (maintained at 110° C.), to thereby yield copolymer A. Table 1 shows the polymerization formula for producing copolymer A, and Table 2 shows physical properties of the copolymer.

Example 2

Synthesis of Copolymer B

The procedure of Example 1 was repeated, except that tetrakis(2-ethyl-1,3-hexanediolato)titanium was replaced by titanium di-n-butoxide(bis-2,4-pentanedionate), to thereby yield copolymer B. Table 1-1 shows the polymerization formula for producing copolymer B, and Table 2-1 shows physical properties of the copolymer.

Example 3

Synthesis of Copolymer C

The procedure of Example 1 was repeated, except that tetrakis(2-ethyl-1,3-hexanediolato)titanium was replaced by tetrakis(2-ethylhexoxy)titanium, to thereby yield copolymer C. Table 1-1 shows the polymerization formula for producing copolymer C, and Table 2-1 shows physical properties of the copolymer.

Example 4

Synthesis of Copolymer D

The procedure of Example 1 was repeated, except that N,N-bis(trimethylsilyl)aminopropylmethyldiethoxysilane was replaced by 1-trimethylsilyl-2-ethoxy-2-methyl-1-aza-2-sila-cyclopentane, obtained in Synthesis Example 2, to thereby yield copolymer D. Table 1-1 shows the polymerization formula for producing copolymer D, and Table 2-1 shows physical properties of the copolymer.

Example 5

Synthesis of Copolymer E

The procedure of Example 1 was repeated, except that N,N-bis(trimethylsilyl)aminopropylmethyldiethoxysilane was replaced by 3-(2,2,5,5-tetramethyl(1-aza-2,5-disilacyclopentane)-1-yl)-propylmethyldiethoxysilane, obtained in Synthesis Example 3, to thereby yield copolymer E. Table 1-1 shows the polymerization formula for producing copolymer E, and Table 2-1 shows physical properties of the copolymer.

Comparative Example 1

Synthesis of Copolymer F

The procedure of Example 1 was repeated, except that no tetrakis(2-ethyl-1,3-hexanediolato)titanium was added, to thereby yield copolymer F. Table 1-1 shows the polymerization formula for producing copolymer F, and Table 2-1 shows physical properties of the copolymer.

Comparative Example 2

Synthesis of Copolymer G

The procedure of Example 1 was repeated, except that tetrakis(2-ethyl-1,3-hexanediolato)titanium was replaced by tin 2-ethylhexanoate, to thereby yield copolymer G. Table 1-1 shows the polymerization formula for producing copolymer C, and Table 2-1 shows physical properties of the copolymer.

Comparative Example 3

Synthesis of Copolymer H

The procedure of Example 1 was repeated, except that N,N-bis(trimethylsilyl)aminopropylmethyldiethoxysilane was replaced by N,N-bis(trimethylsilyl)aminopropyldimethylethoxysilane, obtained in Synthesis Example 4, to thereby yield copolymer H. Table 1-1 shows the polymerization formula for producing copolymer H, and Table 2-1 shows physical properties of the copolymer.

Comparative Example 4

Synthesis of Copolymer I

The procedure of Example 1 was repeated, except that N,N-bis(trimethylsilyl)aminopropylmethyldiethoxysilane was replaced by N-methyl-N-(trimethylsilyl)aminopropylmethyldiethoxysilane, obtained in Synthesis Example 5, to thereby yield copolymer I. Table 1-1 shows the polymerization formula for producing copolymer I, and Table 2-1 shows physical properties of the copolymer.

Comparative Example 5

Synthesis of Copolymer J

The procedure of Example 1 was repeated, except that N,N-bis(trimethylsilyl)aminopropylmethyldiethoxysilane was replaced by N,N-dimethyl-3-aminopropylmethyldiethoxysilane, obtained in Synthesis Example 6, to thereby yield copolymer J. Table 1-1 shows the polymerization formula for producing copolymer J, and Table 2-1 shows physical properties of the copolymer.

Comparative Example 6

Synthesis of Copolymer K

The procedure of Example 1 was repeated, except that N,N-bis(trimethylsilyl)aminopropylmethyldiethoxysilane was replaced by N,N-bis(trimethylsilyl)aminopropyltriethoxysilane, obtained in Synthesis Example 7, to thereby yield copolymer K. Table 1-1 shows the polymerization formula for producing copolymer K, and Table 2-1 shows physical properties of the copolymer.

Example 6

Synthesis of Copolymer L

The procedure of Example 1 was repeated, except that N,N-bis(trimethylsilyl)aminopropylmethyldiethoxysilane was replaced by N,N-bis(trimethylsilyl)aminopropylmethyldimethoxysilane, obtained in Synthesis Example 8, to thereby yield copolymer L Table 1-2 shows the polymerization formula for producing copolymer L, and Table 2-2 shows physical properties of the copolymer.

Example 7

Synthesis of Copolymer M

The procedure of Example 1 was repeated, except that N,N-bis(trimethylsilyl)aminopropylmethyldiethoxysilane was replaced by N,N-bis(trimethylsilyl)aminopropylethyldiethoxysilane, obtained in Synthesis Example 9, to thereby yield copolymer M. Table 1-2 shows the polymerization formula for producing copolymer M, and Table 2-2 shows physical properties of the copolymer.

Example 8

Synthesis of Copolymer N

The procedure of Example 1 was repeated, except that N,N-bis(trimethylsilyl)aminopropylmethyldiethoxysilane was replaced by N,N-bis(trimethylsilyl)aminobutylmethyldiethoxysilane, obtained in Synthesis Example 10, to thereby yield copolymer N. Table 1-2 shows the polymerization formula for producing copolymer N, and Table 2-2 shows physical properties of the copolymer.

Example 9

Synthesis of Copolymer O

The procedure of Example 1 was repeated, except that N,N-bis(trimethylsilyl)aminopropylmethyldiethoxysilane was replaced by N,N-bis(trimethylsilyl)-p-aminophenylmethyldimethoxysilane, obtained in Synthesis Example 11, to thereby yield copolymer O. Table 1-2 shows the polymerization formula for producing copolymer O, and Table 2-2 shows physical properties of the copolymer.

Example 10

Synthesis of Copolymer P

The procedure of Example 1 was repeated, except that N,N-bis(trimethylsilyl)aminopropylmethyldiethoxysilane was replaced by N,N-bis(trimethylsilyl)aminoundecylmethyldiethoxysilane, obtained in Synthesis Example 11, to thereby yield copolymer P. Table shows the polymerization formula for producing copolymer P, and Table 2-2 shows physical properties of the copolymer.

TABLE 1-1

| | EX. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Modified conjugated diene based polymer Polymerization formula | A | B | C | D | E | F | G | H | I | J | K |
| Solvent: cyclohexane (g) | 2750 | 2750 | 2750 | 2750 | 2750 | 2750 | 2750 | 2750 | 2750 | 2750 | 2750 |
| Vinyl content regulator: tetrahydrofuran (g) | 41.3 | 41.3 | 41.3 | 41.3 | 41.3 | 41.3 | 41.3 | 41.3 | 41.3 | 41.3 | 41.3 |
| Monomers | | | | | | | | | | | |
| styrene (g) | 125 | 125 | 125 | 125 | 125 | 125 | 125 | 125 | 125 | 125 | 125 |
| butadiene (g) | 375 | 375 | 375 | 375 | 375 | 375 | 375 | 375 | 375 | 375 | 375 |
| Polymerization initiator | | | | | | | | | | | |
| n-Butyllithium (mg) | 215 | 215 | 215 | 215 | 215 | 215 | 215 | 215 | 215 | 215 | 215 |
| Modifying agent | | | | | | | | | | | |
| N—Si-1*[1] (mg) | 1129 | 1129 | 1129 | — | — | 1129 | 1129 | — | — | — | — |
| N—Si-2*[2] (mg) | — | — | — | 699 | — | — | — | — | — | — | — |
| N—Si-3*[3] (mg) | — | — | — | — | 1075 | — | — | — | — | — | — |
| N—Si-4*[4] (mg) | — | — | — | — | — | — | — | 1027 | — | — | — |
| N—Si-5*[5] (mg) | — | — | — | — | — | — | — | — | 902 | — | — |
| N—Si-6*[6] (mg) | — | — | — | — | — | — | — | — | — | 675 | — |
| N—Si-7*[7] (mg) | — | — | — | — | — | — | — | — | — | — | 1231 |
| Condensation-accelerating agent | | | | | | | | | | | |
| Ti(EHDO)$_4$*[8] (g) | 8.11 | — | — | 8.11 | 8.11 | — | — | 8.11 | 8.11 | 8.11 | 8.11 |
| Ti(nObu)$_2$(acac)$_2$*[9] (g) | — | 4.30 | — | — | — | — | — | — | — | — | — |

TABLE 1-1-continued

|  | EX. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Ti(OEH)$_4$*[10] (g) | — | — | 6.19 | — | — | — | — | — | — | — | — |
| Sn(EHA)$_2$*[11] (g) | — | — | — | — | — | — | 4.09 | — | — | — | — |

Note:
<Modifying agents>
*[1]N—Si-1: N,N-bis(trimethylsilyl)aminopropylmethyldiethoxysilane
*[2]N—Si-2: 1-trimethylsilyl-2-ethoxy-2-methyl-1-aza-2-cyclopentane
*[3]N—Si-3: 3-(2,2,5,5-tetramethyl(1-aza-2,5-disilacyclopentane)-1-yl)-propylmethyldiethoxysilane
*[4]N—Si-4: N,N-bis(trimethylsilyl)aminopropyldimethylethoxysilane
*[5]N—Si-5: N-methyl(trimethylsilyl)aminopropylmethyldiethoxysilane
*[6]N—Si-6: N,N-dimethyl-3-aminopropylmethyldiethoxysilane
*[7]N—Si-7: N,N-bis(trimethylsilyl)aminopropyltriethoxysilane
*[8]Ti(EHDO)$_4$: tetrakis(2-ethyl-1,3-hexanediolato)titanium
*[9]Ti(nOBu)$_2$(acac)$_2$: titanium di-n-butoxide (bis-2,4-pentanedionate)
*[10]Ti(0EH)$_4$: tetrakis(2-ethylhexoxy)titanium
*[11]Sn(EHA)$_2$: tin 2-ethylhexanoate

TABLE 1-2

|  | Ex. 6 | Ex. 7 | Ex. 8 | Ex. 9 | Ex. 10 |
|---|---|---|---|---|---|
| Modified conjugated diene based polymer | L | M | N | O | P |
| Polymerization formula |  |  |  |  |  |
| Solvent: cyclohexane (g) | 2750 | 2750 | 2750 | 2750 | 2750 |
| Vinyl content regulator: tetrahydrofuran (g) | 41.3 | 41.3 | 41.3 | 41.3 | 41.3 |
| Monomers |  |  |  |  |  |
| styrene (g) | 125 | 125 | 125 | 125 | 125 |
| butadiene (g) | 375 | 375 | 375 | 375 | 375 |
| Polymerization initiator |  |  |  |  |  |
| n-Butyllithium (mg) | 215 | 215 | 215 | 215 | 215 |
| Modifying agent |  |  |  |  |  |
| N—Si-8*[12] (mg) | 987 | — | — | — | — |
| N—Si-9*[13] (mg) | — | 1212 | — | — | — |
| N—Si-10*[14] (mg) | — | — | 1212 | — | — |
| N—Si-11*[15] (mg) | — | — | — | 1164 | — |
| N—Si-12*[16] (mg) | — | — | — | — | 1791 |
| Condensation-accelerating agent |  |  |  |  |  |
| Ti(EHDO)$_4$*[8] (g) | 8.11 | 8.11 | 8.11 | 8.11 | 8.11 |

*[12]N,N-bis(trimethylsilyl)aminopropylmethyldimethoxysilane
*[13]N,N-bis(trimethylsilyl)aminopropylethyldiethoxysilane
*[14]N,N-bis(trimethylsilyl)aminobutylmethyldiethoxysilane
*[15]N,N-bis(trimethylsilyl)-p-aminophenylmethyldimethoxysilane
*[16]N,N-bis(trimethylsilyl)aminoundecylmethyldiethoxysilane

TABLE 2-1

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Modified conjugated diene based copolymer | A | B | C | D | E | F | G | H | I | J | K |
| Molecular characteristics of polymers |  |  |  |  |  |  |  |  |  |  |  |
| Bound styrene content (%) | 20 | 20 | 21 | 20 | 20 | 20 | 20 | 21 | 21 | 20 | 20 |
| Vinyl content (%) | 56 | 56 | 55 | 55 | 55 | 55 | 56 | 56 | 55 | 55 | 55 |
| Mooney viscosity | 32 | 31 | 41 | 33 | 34 | 25 | 71 | 18 | 30 | 30 | 36 |

TABLE 2-2

|  | Ex. 6 | Ex. 7 | Ex. 8 | Ex. 9 | Ex. 10 |
|---|---|---|---|---|---|
| Modified conjugated diene based copolymer | L | M | N | O | P |
| Molecular characteristics of polymers |  |  |  |  |  |
| Bound styrene content (%) | 20 | 20 | 20 | 20 | 20 |
| Vinyl content (%) | 55 | 55 | 55 | 55 | 55 |
| Mooney viscosity | 40 | 34 | 38 | 33 | 33 |

Examples 11 to 20 and Comparative Examples 7 to 12

Each of the modified diene polymers A to P shown in Table 1-1 (produced in Examples 1 to 5 and Comparative Examples 1 to 5) and Table 1-2 (produced in Examples 6 to 10), was blended with additives shown in Table 3 (formulation I), to thereby prepare a carbon-black-blended rubber composition through the below-described procedure. The rubber composition was vulcanized at 160° C. for 15 minutes, and physical properties of the vulcanized rubber were determined.

The results are shown in Tables 4-1 and 4-2. In Tables and 4-2, each of heat-buildup-suppressing performance (tan δ; 50° C.) and wear resistance is shown by an index with respect to the corresponding value of the sample of Comparative Example 7, which is taken as 100. The greater the value of an index, the more excellent the corresponding property in each of heat-buildup-suppressing performance (tan δ: 50° C.) and wear resistance.

Properties of polymer molecules of the modified diene polymers A to P shown in Tables 1-1 and 1-2 are shown in Tables 2-1 and 2-2.

TABLE 3

| Formulation (parts by mass) | | Formulation I | Formulation II |
|---|---|---|---|
| 1st stage | Modified conjugated diene based polymer*1 | 80 | 80 |
| | Polyisoprene rubber*2 | 20 | 20 |
| | Aromatic oil*3 | 10 | 10 |
| | Carbon black*4 | 50 | — |
| | Silica*5 | — | 55 |
| | Silane coupling agent*6 | — | 5.5 |
| | Stearic acid | 2.0 | 2.0 |
| | Anti-aging agent 6C*7 | 1.0 | 1.0 |

TABLE 3-continued

| Formulation (parts by mass) | | | Formulation I | Formulation II |
|---|---|---|---|---|
| 2nd stage | Zinc Oxide | | 3.0 | 3.0 |
| | Vulcanization accelerator | DPG*8 | 0.5 | 1 |
| | | DM*9 | 0.5 | 1 |
| | | NS*10 | 0.5 | 1 |
| | Sulfur | | 1.5 | 1.5 |

Note:
*1 Modified conjugated diene based polymer: Shown in Table 1
*2 Polyisoprene rubber: IR2200, product of JSR
*3 Aromatic oil: Aromax #3, product of Fuji Kosan Co., Ltd.
*4 Carbon black: DIABLACK N339, product of Mitsubishi Chemical Corporation
*5 Silica: AQ, product of Tosoh Silica
*6 Silane coupling agent: Si69, product of Degussa
*7 Anti-aging agent 6C: Nocrac 6C, product of Ouchi Shinko Chemical Industrial Co., Ltd.
*8 Vulcanization accelerator DPG: Nocceler D, product of Ouchi Shinko Chemical Industrial Co., Ltd.
*9 Vulcanization accelerator DM: Nocceler DM, product of Ouchi Shinko Chemical Industrial Co., Ltd.
*10 Vulcanization accelerator NS: Nocceler NS-F, product of Ouchi Shinko Chemical Industrial Co., Ltd.

TABLE 4-1

| | Ex. 11 | Ex. 12 | Ex. 13 | Ex. 14 | Ex. 15 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|
| Modified conjugated diene based polymer | A | B | C | D | E | F | G | H | I | J | K |
| Vulcanizate characteristics (carbon black blend) | | | | | | | | | | | |
| tan δ (50° C.) (index) | 131 | 121 | 108 | 129 | 125 | 100 | 97 | 84 | 70 | 48 | 79 |
| Wear resistance (index) | 128 | 116 | 107 | 127 | 121 | 100 | 96 | 83 | 69 | 46 | 74 |

TABLE 4-2

| | Ex. 16 | Ex. 17 | Ex. 18 | Ex. 19 | Ex. 20 |
|---|---|---|---|---|---|
| Modified conjugated diene based polymer | L | M | N | O | P |
| Vulcanizate characteristics (carbon black blend) | | | | | |
| tan δ (50° C.) (index) | 132 | 130 | 128 | 110 | 112 |
| Wear resistance (index) | 125 | 128 | 120 | 105 | 108 |

Examples 21 to 30 and Comparative Examples 13 to 18

Each of the modified diene polymers A to P shown in Table 1-1 (produced in Examples 1 to 5 and Comparative Examples 1 to 6) and in Table 1-2 (produced in Examples 6 to 10), was blended with additives shown in Table 3 (formulation II), to thereby prepare a silica-blended rubber composition through the below-described procedure. The rubber composition was vulcanized at 160° C. for 15 minutes, and physical properties of the vulcanized rubber were determined.

The results are shown in Tables 5-1 and 5-2. In Tables 5-1 and 5-2, each of heat-buildup-suppressing performance (tan δ: 50° C.) and wear resistance is shown by an index with respect to the corresponding value of the sample of Comparative Example 13, which is taken as 100. The more the value of an index, the more excellent the corresponding property in each of heat-buildup-suppressing performance (tan δ: 50° C.) and wear resistance. The results are shown in Tables 5-1 and 5-2.

TABLE 5-1

|  | Ex. 21 | Ex. 22 | Ex. 23 | Ex. 24 | Ex. 25 | Comp. Ex. 13 | Comp. Ex. 14 | Comp. Ex. 15 | Comp. Ex. 16 | Comp. Ex. 17 | Comp. Ex. 18 |
|---|---|---|---|---|---|---|---|---|---|---|---|
| Modified conjugated diene based polymer | A | B | C | D | E | F | G | H | I | J | K |
| Vulcanizate characteristics (silica blend) | | | | | | | | | | | |
| tanδ (50° C.) (index) | 126 | 112 | 119 | 124 | 124 | 100 | 94 | 72 | 98 | 89 | 91 |
| Wear resistance (index) | 124 | 109 | 117 | 121 | 120 | 100 | 92 | 69 | 97 | 84 | 90 |

TABLE 5-2

|  | Ex. 26 | Ex. 27 | Ex. 28 | Ex. 29 | Ex. 30 |
|---|---|---|---|---|---|
| Modified conjugated diene based polymer | L | M | N | O | P |
| Vulcanizate characteristics (silica blend) | | | | | |
| tanδ (50° C.) (index) | 125 | 126 | 124 | 128 | 118 |
| Wear resistance (index) | 125 | 123 | 123 | 126 | 115 |

As is clear from Tables 4-1, 4-2, 5-1 and 5-2, the rubber composition samples of the present invention (Examples 11 to 15) containing carbon black serving as a filler and the modified conjugated diene based polymer produced through a step (a) of modifying a conjugated diene based polymer with a silicon compound essentially having a protected primary amino group and a bi-functional silicon atom to which an alkoxy group is bonded, and a step (b) of performing condensation reaction in the presence of a titanium compound serving as a condensation-accelerating agent exhibit excellent heat-buildup-suppressing performance (low loss property) and wear resistance, as compared with the rubber composition sample (Comparative Example 7) produced through the step (a) (not including the step (b)); the rubber composition sample (Comparative Example 8) produced through the step (a) and the step (b) but employing a different condensation accelerator; and the rubber composition samples (Comparative Examples 9 to 12) produced through the step (b) and the step (a) but employing a different modifying agent.

Particularly, the effect of the invention is remarkable, as compared with the rubber composition samples of Comparative Examples 9 to 12 produced from a modifying agent differing from the modifying agent employed in the invention.

The compositions shown in Tables 5-1 and 5-2 were prepared from silica serving as a filler, instead of carbon black. As is clear from Table 5, use of silica instead of carbon black can also provide excellent heat-buildup-suppressing performance and wear resistance.

Industrial Applicability

The rubber composition of the invention containing a modified copolymer produced through the method of the present invention attains excellent interaction between the rubber component and carbon black and/or silica, whereby dispersibility of carbon black and/or silica in the composition can be improved, and tires exhibiting excellent heat-buildup-suppressing performance, fracture characteristics, wear resistance, etc. can be provided. Particularly, the rubber composition cab be effectively employed as tire tread coating for rubber low-fuel-consumption automobiles.

The invention claimed is:

1. A process for producing a modified conjugated diene based polymer, the process comprising a step (a) of reacting a silicon compound with a conjugated diene based polymer having an active end so that the reaction takes places at the active end, the silicon compound having a protected primary amino group in the molecule thereof and a silicon atom to which a hydrocarbyloxy group and a reactive group are bonded, to thereby modify the active end, and a step (b) of performing condensation reaction which involves the group derived from the silicon compound and bonded to the active end of the conjugated diene based polymer, in the presence of a titanium compound serving as a titanium-based condensation-accelerating agent, wherein the protected amino group is capable of being deprotected by hydrolysis to be a primary amino group, and wherein the titanium compound is at least one selected from the group consisting of tetrakis(2-ethyl-1,3-hexanediolato)titanium and titanium di-n-butoxide bis(2,4-pentanedionate).

2. A process for producing a modified conjugated diene based polymer as described in claim 1, which further includes a deprotection step (c) of hydrolyzing the group derived from the silicon compound and bonded to the active end of the conjugated diene based polymer, whereby the protected primary amino group contained in the group bonded to the active end is converted to a free amino group.

3. A process for producing a modified conjugated diene based polymer as described in claim 1, wherein the silicon compound employed in the step (a) is a silicon compound represented by formula (I):

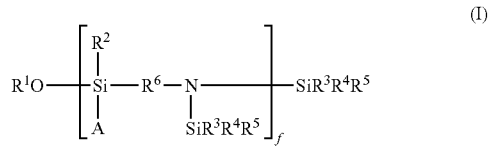

wherein each of $R^1$ and $R^2$ represents a hydrocarbon group having 1 to 20 carbon atoms, each of $R^3$ to $R^5$ represents a hydrocarbon group having 1 to 20 carbon atoms, $R^6$ represents a divalent hydrocarbon group having 1 to 12 carbon atoms, A represents a reactive group, and f is an integer of 1 to 10; or a silicon compound represented by formula (III):

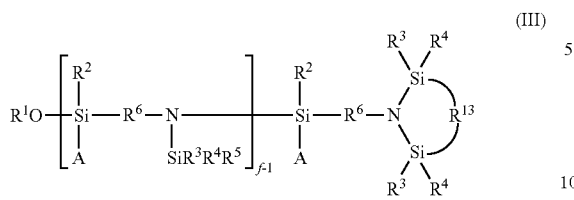

(III)

wherein each of $R^1$ and $R^2$ represents a hydrocarbon group having 1 to 20 carbon atoms, each of $R^3$ to $R^5$ represents a hydrocarbon group having 1 to 20 carbon atoms, $R^6$ represents a divalent hydrocarbon group having 1 to 12 carbon atoms, $R^{13}$ represents a divalent hydrocarbon group having 1 to 12 carbon atoms, A represents a reactive group, and f is an integer of 1 to 10.

4. A process for producing a modified conjugated diene based polymer as described in claim 3, wherein the group A in formula (I) is a halogen atom or a hydrocarbyloxy group having 1 to 20 carbon atoms.

5. A process for producing a modified conjugated diene based polymer as described in claims 1, wherein the conjugated diene based polymer having an active end is produced through anionic polymerization, in the presence of an organic alkali metal compound serving as a polymerization initiator, of a conjugated diene compound singly or of a conjugated diene compound and an aromatic vinyl compound in combination.

6. A process for producing a modified conjugated diene based polymer as described in claim 5, wherein the conjugated diene compound is at least one selected from the group consisting of 1,3-butadiene, isoprene, and 2,3-dimethyl-1,3-butadiene.

7. A process for producing a modified conjugated diene based polymer as described in claim 5, wherein the aromatic vinyl compound is styrene.

8. A process for producing a modified conjugated diene based polymer as described in claim 5, wherein the conjugated diene based polymer has a repeating unit derived from the aromatic vinyl compound in an amount of 0 to 55 mass % based on the total repeating unit present in the conjugated diene based polymer and a vinyl bond content of 7 to 65 mass % based on the total conjugated diene portion.

9. A modified conjugated diene based polymer produced by the process as recited in claim 1.

10. A rubber composition comprising a modified conjugated diene based polymer produced by a process comprising
a step (a) of reacting a silicon compound with a conjugated diene based polymer having an active end so that the reaction takes place at the active end, the silicon compound having a protected primary amino group in the molecule thereof and a silicon atom to which a hydrocarbyloxy group and a reactive group are bonded, to thereby modify the active end, and
a step (b) of performing condensation reaction which involves the group derived from the silicon compound and bonded to the active end of the conjugated diene based polymer, in the presence of a titanium compound serving as a titanium-based condensation-accelerating agent,
wherein the protected amino group is capable of being deprotected by hydrolysis to be a primary amino group, and wherein the titanium compound is at least one selected from the group consisting of tetrakis(2-ethyl-1,3-hexanediolato)titanium and titanium di-n-butoxide bis(2,4-pentanedionate).

11. A rubber composition as described in claim 10, which comprises a rubber component containing 15 mass % or more of the modified conjugated diene based polymer in an amount of 100 parts by mass and silica and/or carbon black in the total amount of 20 to 120 parts by mass.

12. A rubber composition as described in claim 11, wherein the rubber component comprises the modified conjugated diene based polymer in an amount of 15 to 100 mass % and at least one selected from the group consisting of a natural rubber, a synthetic isoprene rubber, a butadiene rubber, a styrene-butadiene rubber, an ethylene-α-olefin copolymer rubber, an ethylene-α-olefin-diene copolymer rubber, a chloroprene rubber, a halogenated butyl rubber, and a styrene-isobutylene copolymer having a halomethyl group, in an amount of 85 to 0 mass %.

13. A rubber composition as described in claim 10, wherein the process further includes a deprotection step (c) of hydrolyzing the group derived from the silicon compound and bonded to the active end of the conjugated diene based polymer, whereby the protected primary amino group contained in the group bonded to the active end is converted to a free amino group.

14. A rubber composition as described in claim 10, wherein the silicon compound employed in the step (a) is a silicon compound represented by formula (I):

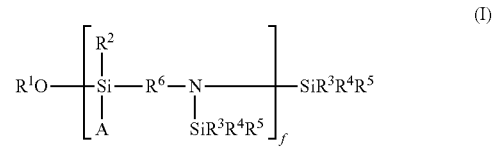

(I)

wherein each of $R^1$ and $R^2$ represents a hydrocarbon group having 1 to 20 carbon atoms, each of $R^3$ to $R^5$ represents a hydrocarbon group having 1 to 20 carbon atoms, $R^6$ represents a divalent hydrocarbon group having 1 to 12 carbon atoms, A represents a reactive group, and f is an integer of 1 to 10; or
a silicon compound represented by formula (III):

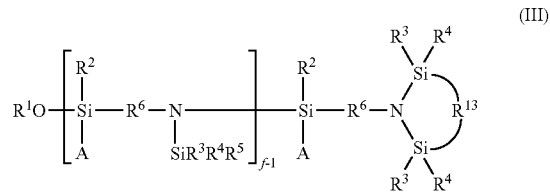

(III)

wherein each of $R^1$ and $R^2$ represents a hydrocarbon group having 1 to 20 carbon atoms, each of $R^3$ to $R^5$ represents a hydrocarbon group having 1 to 20 carbon atoms, $R^6$ represents a divalent hydrocarbon group having 1 to 12 carbon atoms, $R^{13}$ represents a divalent hydrocarbon group having 1 to 12 carbon atoms, A represents a reactive group, and f is an integer of 1 to 10.

15. A rubber composition as described in claim 14, wherein the group A in formula (I) is a halogen atom or a hydrocarbyloxy group having 1 to 20 carbon atoms.

16. A rubber composition as described in claim 10, wherein the conjugated diene based polymer having an active end is produced through anionic polymerization, in the presence of an organic alkali metal compound serving as a polymerization initiator, of a conjugated diene compound singly or of a conjugated diene compound and an aromatic vinyl compound in combination.

17. A rubber composition as described in claim 16, wherein the conjugated diene compound is at least one selected from the group consisting of 1,3-butadiene, isoprene, and 2,3-dimethyl-1,3-butadiene.

18. A rubber composition as described in claim 16, wherein the aromatic vinyl compound is styrene.

19. A rubber composition as described in claim 10, wherein the conjugated diene based polymer has a repeating unit derived from an aromatic vinyl compound in an amount of 0 to 55 mass % based on the total repeating unit present in the conjugated diene based polymer and a vinyl bond content of 7 to 65 mass % based on the total conjugated diene portion.

20. A pneumatic tire employing the rubber composition as recited in claim 10.

21. A pneumatic tire comprising a tread, a base tread, or a sidewall, wherein the tread, the base tread, or the sidewall employs the rubber composition as recited in claim 10.

* * * * *